US007783871B2

(12) United States Patent
Combs et al.

(10) Patent No.: US 7,783,871 B2
(45) Date of Patent: Aug. 24, 2010

(54) METHOD TO REMOVE STALE BRANCH PREDICTIONS FOR AN INSTRUCTION PRIOR TO EXECUTION WITHIN A MICROPROCESSOR

(75) Inventors: Jonathan D. Combs, Austin, TX (US); Hoichi Cheong, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1105 days.

(21) Appl. No.: 10/609,814

(22) Filed: Jun. 30, 2003

(65) Prior Publication Data

US 2004/0268102 A1 Dec. 30, 2004

(51) Int. Cl.
*G06F 9/00* (2006.01)

(52) U.S. Cl. .................................................. 712/239
(58) Field of Classification Search ................ 712/239
See application file for complete search history.

(56) References Cited

U.S. PATENT DOCUMENTS 5,450,555 A * 9/1995 Brown et al. ................ 712/228
6,012,125 A * 1/2000 Tran ........................... 711/125
6,532,534 B1 * 3/2003 Sunayama et al. .......... 712/240
7,024,545 B1 * 4/2006 Zuraski et al. .............. 712/240

OTHER PUBLICATIONS

Q. Zhao, S. Lee, and D. Lilja, "Using Hyperprediction to Compensate for Delayed Updates in Value Predictors," Technical Report No. ARCTiC 01-02, Laboratory for Advanced Research in Computing Technology and Compilers, Univ. of Minnesota, Jun. 2001.*
S. Lee, Y. Wang, and P. Yew. Decoupled value prediction on trace processors. In 6th International Symposium on High Performance Computer Architecture, pp. 231-240, Jan 2000.*

* cited by examiner

*Primary Examiner*—Alford W Kindred
*Assistant Examiner*—Benjamin P Geib
(74) *Attorney, Agent, or Firm*—Blakely, Sokoloff, Taylor & Zafman LLP

(57) ABSTRACT

According to one embodiment a computer system is disclosed. The computer system includes a microprocessor and a chipset coupled to the microprocessor. The microprocessor removes stale branch instructions prior to the execution of a first cache line by finding existing branch prediction data for the first cache line.

13 Claims, 4 Drawing Sheets

METHOD TO REMOVE STALE BRANCH PREDICTIONS FOR AN INSTRUCTION PRIOR TO EXECUTION WITHIN A MICROPROCESSOR

FIELD OF THE INVENTION

The present invention relates to computer systems; more particularly, the present invention relates to central processing units (CPUs).

BACKGROUND

In high-performance, superscalar microprocessors, a decoded instruction cache is used to improve performance. This type of instruction cache improves the bandwidth, throughput, and latency of "fetch" and "decode" portions of microprocessors by quickly sending packets of decoded macro-instructions (called micro-operations) into the core of the microprocessor. At the end of the pipeline that fetches and decodes macro instructions, the micro-operations are typically assembled into packets and written into a decoded cache on their way into an allocation pipeline.

Since branch prediction is a critical element to microprocessor performance, the use of a decoded instruction cache typically requires the construction of a branch prediction mechanism capable of interfacing with the decoded nature of the cache. This is especially complex in x86 microprocessors, developed by Intel Corporation of Santa Clara, Calif., due to the variable length of the macroinstructions, and the fact that the complex instruction set nature of each macroinstruction usually causes a variable number of micro-operations to represent it.

Due to aggressive pipelining and the need to provide quick predictions, a branch predictor used in such a machine could be required to provide branch predictions and act upon those predictions without being able to verify that the prediction it is making is really meant for the cache line being fetched. The prediction being made may have been meant for an older cache line mapped to the same position.

Typically, these problems arise due to replacing lines in the decoded instruction cache that had active branch predictions. These prediction entries become stale once the lines they were meant to predict for are removed. This type of invalid control speculation has serious performance implications and a mechanism is required to prevent it from happening too often. Current mechanisms that deal with the removal of stale prediction information do so at the end of a microprocessor pipeline based on post-retirement information. Removing stale prediction information at this stage may be unreliable in some instances.

DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism for removing stale branch predictions in a microprocessor is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
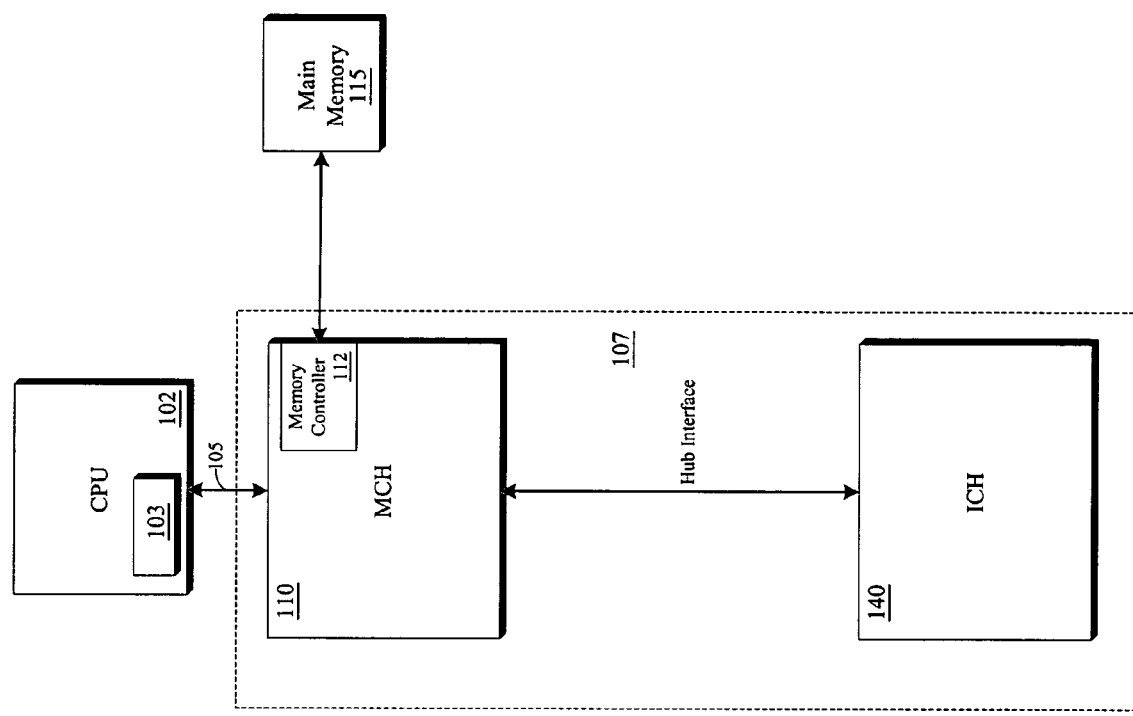
FIG. 1 illustrates one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. Additional devices may also be coupled to bus 105, such as multiple CPUs and/or multiple system memories.

In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Component Interconnect bus adhering to a Specification Revision 2.1 bus developed by the PCI Special Interest Group of Portland, Oreg.

Figure 2:
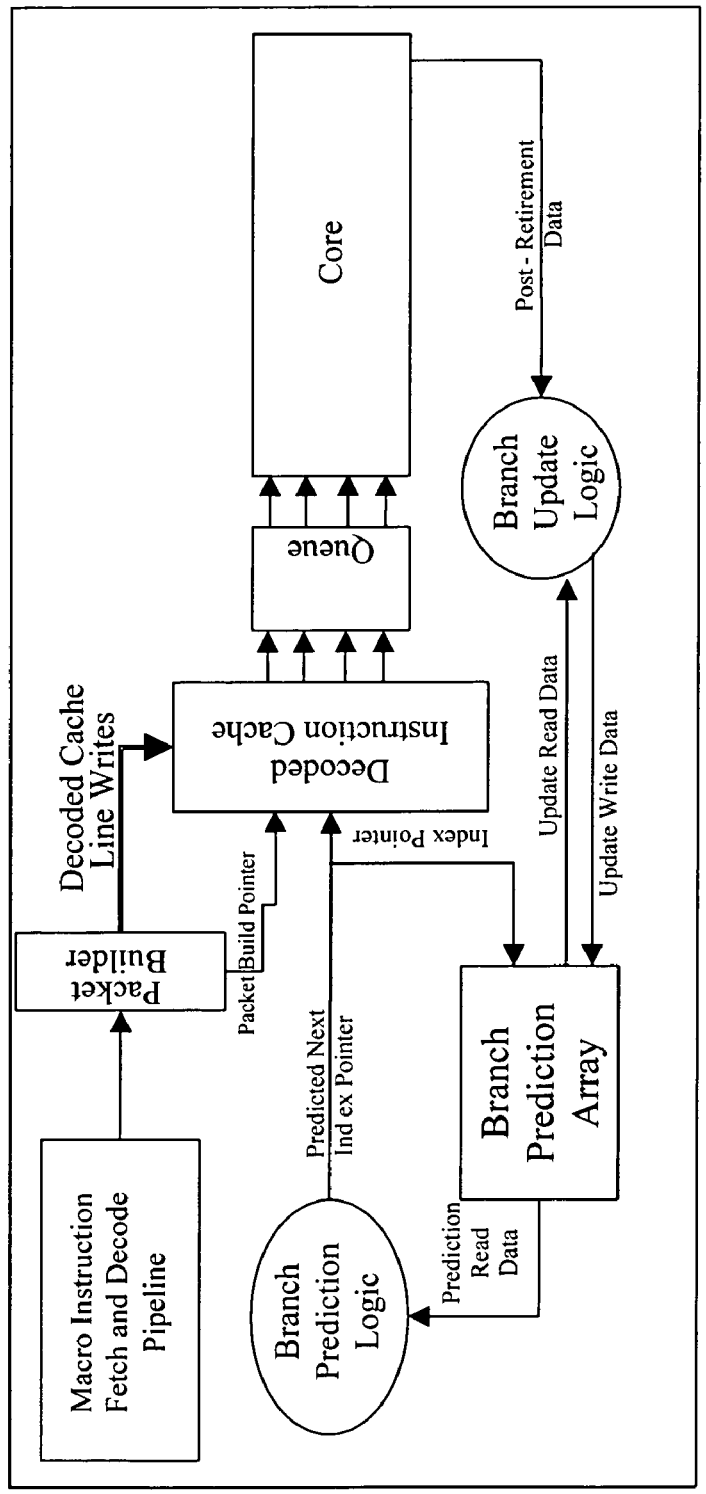
FIG. 2 illustrates an exemplary microprocessor pipeline.

FIG. 2 illustrates an exemplary microprocessor pipeline employing the removal of stale branch predictions. The pipeline shown in FIG. 2 removes stale branch prediction information using post-retirement data to determine whether entries in the branch prediction array are to be invalidated. Typically, the macro-instruction fetch and decode pipeline, packet builder, instruction cache, queue, core and branch update logic are active whenever the processor is receiving instructions through the macro instruction fetch and decode pipeline (e.g., packet building). Meanwhile, the prediction array is partially active and the branch prediction logic is inactive during packet building.

Stale prediction information can be produced when the packet builder writes a new cache line into the decoded instruction cache whenever the previous line had an active prediction. As discussed above, the branch prediction logic for the decoded instruction cache is not making any predictions during the process of building packets. For instance, the branch predictions during the packet building mode are received from a separate branch predictor (not shown) located in the macro-instruction fetch pipeline.

As a result, the prediction read data port is free and the branch prediction logic is not active. When the micro-operations originating from the packet builder arrive at the end of the pipeline, the micro-operations go through the branch update logic. As current forms of branch prediction require a read-modify-write operation to the prediction array, the branch update logic is able to read the predictions for the newly built packet, find stale predictions, and invalidate the stale predictions during the update write.

A problem occurs, however, with such a method. This method of removing stale branch prediction can only catch micro-operations that make it to the post-retirement branch update logic. On various occasions, branch mispredictions will flush early portions of the microprocessor pipeline. Consequently, any micro-operations that have been written into the decoded instruction cache but get flushed from the pipeline will not be able to remove stale predictions.

Also, due to a deeply pipelined machine, there is a chance that newly built packets could be read from the decoded instruction cache before the original packets make it to the branch update logic, allowing the stale predictions to cause performance penalties.

Finally, as the stale predictions do not correlate to the placement of current branches, in order for the branch update logic to catch many of the stale predictions, it must be modified to process any combination of micro-operations sent from the packet builder. Depending on the protocol between retirement and branch update, this may cause a need to throttle the retirement pipeline causing additional performance penalties. Typically, the branch update logic is specialized to only activate due to the presence of branches.

Figure 3:
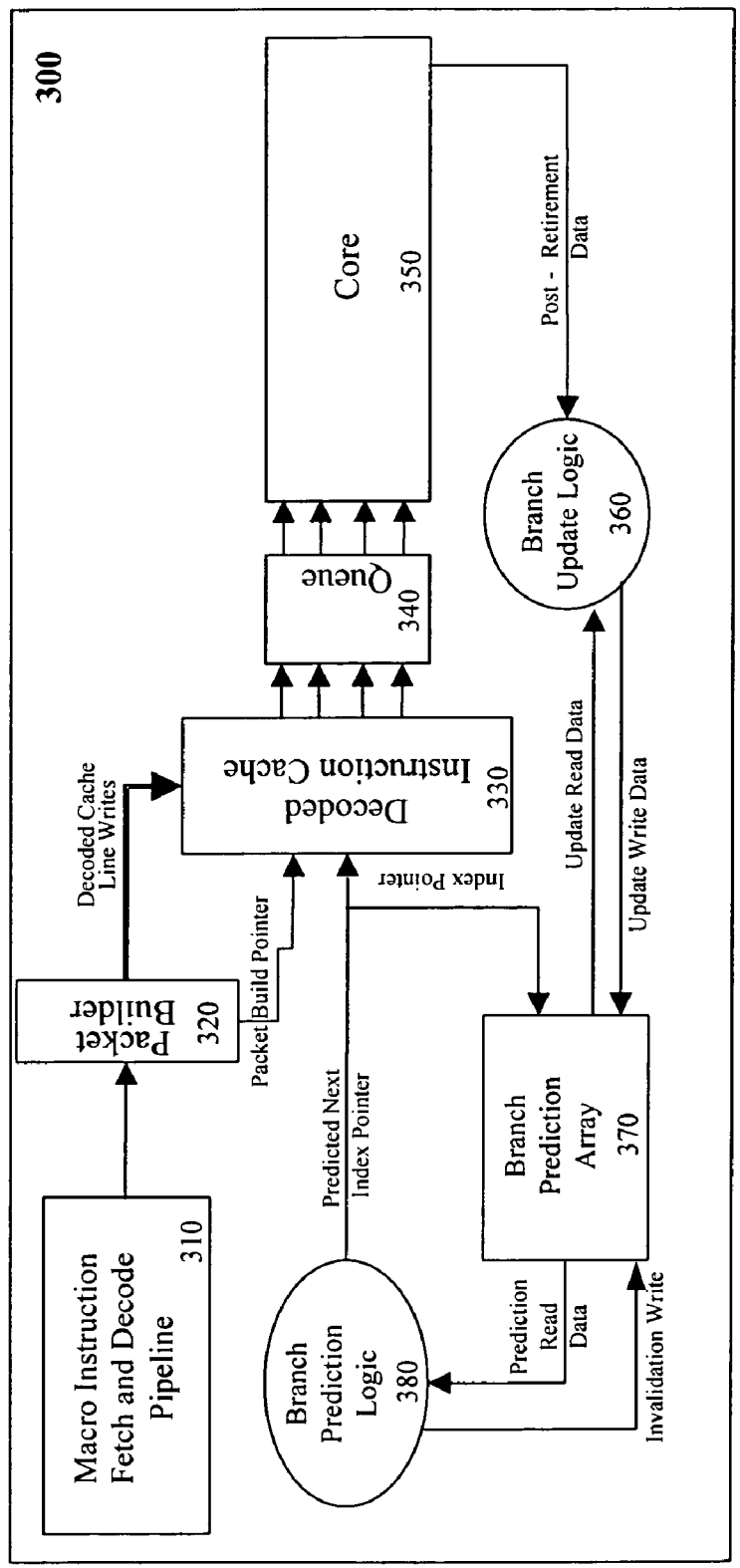
FIG. 3 illustrates one embodiment of a microprocessor pipeline.

According to one embodiment, stale branch predictions are removed prior to the retirement of the micro-operation data. In such an embodiment, stale predictions are removed during the writing of micro-operations into the decoded instruction cache. FIG. 3 illustrates one embodiment of a microprocessor pipeline 300 implementing stale branch prediction removal during the writing of micro-operations into a decoded instruction cache.

Referring to FIG. 3, pipeline 300 includes macro-instruction fetch and decode pipeline 310, packet builder 320, decoded instruction cache 330, micro-operations queue 340, processor core 350, branch update logic 360, branch prediction array 370 and branch prediction logic 380.

Macro-instruction fetch and decode pipeline 310 receives macro-instructions for decoding at pipeline 300. Packet builder 320 decodes the macro-instructions into micro-operations. Packet builder 320 transmits the micro-operations to decoded instruction cache 330 where the micro-operations are stored as cache lines prior to execution.

Queue 340 receives a sequence of micro-operations that are waiting to be processed at core 350. Core 350 performs allocation, execution, retirement and branch update services on received micro-operations. After the micro-operations are retired from core 350, the micro-operations are transmitted to branch update logic 360. Branch update logic 360 performs branch updates by writing update data to branch prediction array 370. In addition, branch update logic 360 reads branch update data from branch prediction array 370.

Branch prediction array 370 stores data corresponding with predictions for various branch jump instructions. As discussed above, the prediction data stored in branch prediction array 370 is updated based upon retirement micro-operations received from branch update logic 360.

Branch prediction logic 380 is implemented in combination with array 370 to perform branch predictions. In one embodiment, branch prediction logic 380 implements algorithms to predict instruction branch jumps. In a further embodiment, branch prediction logic 380 performs invalidation of stale prediction data stored in array 370.

According to one embodiment, branch prediction logic 380 receives information from packet builder 320 during decoding and invalidates stale branch predictions as packet builder 320 is transmitting the micro-operations to decoded instruction cache 330. Thus, the prediction read port at branch prediction logic 380 is activated during packet building.

By activating the branch prediction read port during packet building, hit detection logic (not shown) of branch prediction logic 380 may be used to find entries in branch prediction array 370 that are to be invalidated. According to a further embodiment, branch prediction logic 380 performs a write to array 370 if stale predictions are to be invalidated. A write port to valid bits of branch prediction array 370, the stale predictions can be invalidated just after new decoded cache lines are being written to the instruction cache.

Figure 4:
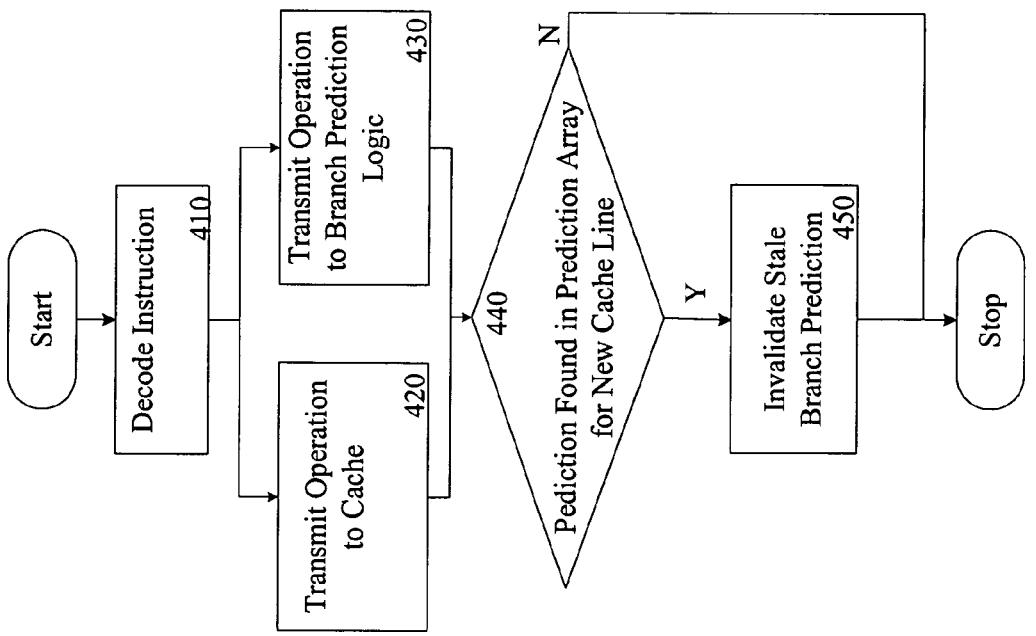
FIG. 4 is a block diagram illustrating one embodiment of the operation of removing stale branch predictions in a microprocessor pipeline.

FIG. 4 is a block diagram illustrating one embodiment of the operation of removing stale branch predictions. At processing block 410, a macro-instruction is decoded into a micro-operation at packet builder 320. At processing block 420, the micro-operation is transmitted to decoded instruction cache 330. At processing 430, information regarding the cache line to which the micro-operation is written is transmitted to branch prediction logic 380.

At decision block 440, it is determined whether a prediction is found in prediction array 470 for the newly written cache line. If a prediction is found for the cache line, a stale branch prediction associated with the cache line is invalidated.

The advantage of the above-described method for removing stale predictions is the closure of nearly all of the holes relating to the removal of stale predictions by checking and removing stale predictions as micro-operations are being written to a corresponding line within a decoded instruction cache. Consequently, any subsequent branch misprediction flush will not prevent the stale predictions from being removed.

Even if the newly created cache lines are quickly accessed, the branch prediction array will not provide stale predictions, as these predictions would have been just removed. Finally, as the logic to detect a branch prediction hit already exists as a component of the prediction process, there is no need to add complexity into the branch update logic in an attempt to use the update read and writes ports for reasons it was not originally intended.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A microprocessor comprising:
   a packet builder to decode macro-instructions to form micro-operations;
   an instruction cache to receive and store the micro-operations as cache lines from the packed builder;
   a branch prediction array, coupled with the instruction cache, to store data corresponding with predictions for branch jump instructions; and
   a branch prediction logic having a read port and a hit detection logic, wherein the read port is activated when the packet builder is decoding the macro-instructions, and wherein the branch prediction logic to:
- receive information from the packet builder via the activated read port when the packet builder is decoding the macro-instructions, and
- invalidate stale branch predictions from the branch prediction array via the hit detection logic when the packet builder is decoding the macro-instructions and transmitting the micro-operations to the instruction cache and as the cache lines are being written to the instruction cache.

2. The microprocessor of claim 1 further comprising a fetch and decode pipeline, coupled with the packet builder, to receive the macro-instructions.

3. The microprocessor of claim 2 further comprising:
- a queue, coupled with the instruction cache, to receive micro-operations that are to be executed; and
- a core, coupled with the queue, to execute the micro-operations.

4. The microprocessor of claim 3 further comprising branch prediction update logic, coupled with the core and the branch prediction array, to write update data to the branch prediction array.

5. The microprocessor of claim 1, wherein the branch prediction logic performs a write command to the branch prediction array if stale predictions are to be invalidated.

6. A method comprising:
- decoding a macro instruction to a micro-operation by the packet builder;
- transmitting the micro-operations from the packet builder to an instruction cache for storage as a first cache line;
- transmitting information corresponding to the first cache line from the packet builder to a branch prediction logic;
- activating a read port of the branch prediction logic when the packet builder is decoding the macro-instructions;
- receiving information from the packet builder via the activated read port when the packet builder is decoding the macro-instructions;
- invalidating a stale branch prediction from a branch prediction array via a hit detection logic of the branch prediction logic when the packet builder is decoding the macro-instructions and transmitting the micro-operations to the instruction cache and as the first cache line is being written to the instruction cache.

7. The method of claim 6 further comprising:
- finding a prediction in the branch prediction array corresponding to the first cache line; and
- invalidating the stale branch prediction if the prediction is found.

8. The method of claim 6 further comprising:
- transmitting the information corresponding to the first cache line from the packet builder to the branch prediction logic at the same time the micro-operations are transmitted to the instruction cache.

9. A computer system comprising:
- a microprocessor having:
  - a packet builder to decode macro-instructions to form micro-operations;
  - an instruction cache to receive and store the micro-operations as cache lines from the packed builder;
  - a branch prediction array, coupled with the instruction cache, to store data corresponding with predictions for branch jump instructions; and
  - a branch prediction logic having a read port and a hit detection logic, wherein the read port is activated when the packet builder is decoding the macro-instructions, and wherein the branch prediction logic to:
    - receive information from the packet builder via the activated read port when the packet builder is decoding the macro-instructions, and
    - invalidate stale branch predictions from the branch prediction array via the hit detection logic when the packet builder is decoding the macro-instructions and transmitting the micro-operations to the instruction cache and as the cache lines are being written to the instruction cache; and
- a chipset coupled with the microprocessor.

10. The microprocessor of claim 9 further comprising:
- a queue, coupled with the instruction cache, to receive micro-operations that are to be executed; and
- a core, coupled with the queue, to execute the micro-operations.

11. The microprocessor of claim 10 further comprising branch prediction update logic, coupled with the core and with the branch prediction array, to write update data to the branch prediction array.

12. A computer system comprising:
- a microprocessor having:
  - a packet builder to decode macro-instructions to form micro-operations;
  - an instruction cache to receive and store the micro-operations as cache lines from the packed builder;
  - a branch prediction array, coupled with the instruction cache, to store data corresponding with predictions for branch jump instructions; and
  - a branch prediction logic having a read port and a hit detection logic, wherein the read port is activated when the packet builder is decoding the macro-instructions, and wherein the branch prediction logic to:
    - receive information from the packet builder via the activated read port when the packet builder is decoding the macro-instructions, and
    - invalidate stale branch predictions from the branch prediction array via the hit detection logic when the packet builder is decoding the macro-instructions and transmitting the micro-operations to the instruction cache and as the cache lines are being written to the instruction cache;
- a chipset coupled with the microprocessor; and
- a memory device coupled with the chipset.

13. The computer system of claim 12, wherein the branch prediction logic performs a write command to the branch prediction array if stale predictions are to be invalidated.

* * * * *